Figure 1:
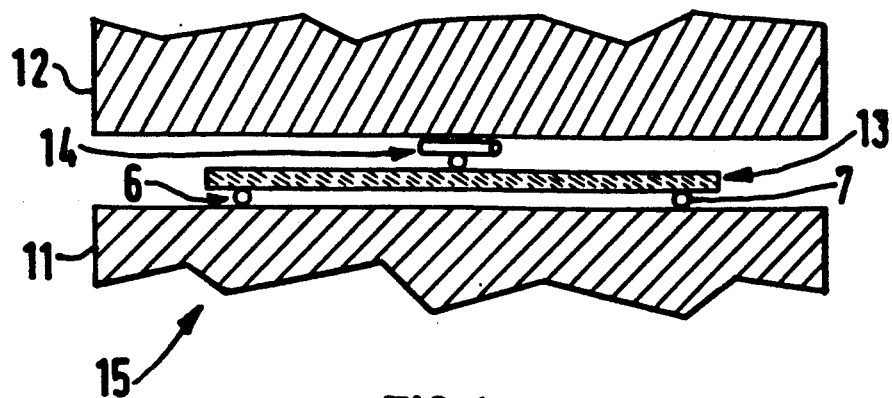

United States Patent [19]

Polaert et al.

[11] Patent Number: 5,199,519
[45] Date of Patent: Apr. 6, 1993

[54] STRAIN GAUGE ELEMENT

[75] Inventors: Rémy H. F. Polaert, Villecresnes; Jean-Pierre Hazan, Sucy en Brie, both of France

[73] Assignee: U.S. Philips Corp., New York, N.Y.

[21] Appl. No.: 788,010

[22] Filed: Nov. 5, 1991

[30] Foreign Application Priority Data

Nov. 9, 1990 [FR] France .................. 90 13915

[51] Int. Cl.⁵ .............. G01G 3/14; G01G 21/12; G01L 1/22
[52] U.S. Cl. .................... 177/211; 177/255; 177/DIG. 9; 73/862.627
[58] Field of Search ............... 177/211, 255, DIG. 9; 73/862.65

[56] References Cited

U.S. PATENT DOCUMENTS

| | | | |
|---|---|---|---|
| 4,433,741 | 2/1984 | Ryckman, Jr. | 177/211 X |
| 4,516,645 | 5/1985 | Wetzel | 177/255 X |
| 4,638,876 | 1/1987 | Balduin et al. | 177/DIG. 9 |

FOREIGN PATENT DOCUMENTS 8705713 7/1987 Fed. Rep. of Germany.
2409495 6/1979 France.

OTHER PUBLICATIONS

"Strain Sensitivity of Thick-Film Resistors" J. Shah et al, IEEE Trans. CHMT-3, No. 4, 1980 p. 554.

Primary Examiner—George H. Miller, Jr.
Attorney, Agent, or Firm—William L. Botjer

[57] ABSTRACT

A strain gauge element in which the compression forces applied by at least one of the pressure members are transmitted to a first surface of the strain gauge by a cross formed by two cylindrical rods, the contact between the strain gauge (or the said pressure member) and the cross being exerted on a generating line of one of the rods (or the other rod) of the cross, permitting the said pressure member to carry out a tilting movement about the said rod (or the other rod).

The reactionary compression forces applied to a second surface of the strain gauge are applied either by at least one cross or by rods.

9 Claims, 1 Drawing Sheet

U.S. Patent  Apr. 6, 1993  5,199,519

STRAIN GAUGE ELEMENT

The invention relates to a strain gauge element comprising a strain gauge pressed between two pressure members which apply compression forces.

Such an element is used in the detection or the measurement of forces, especially in force transducers. These render it possible to realise, for example, balances, load detectors, etc.

It is known from the analysis of the rigidity of materials that a sample can be placed on two support points, upon which a pressure is exerted on the other side of the sample in the centre of the two application points, thus utilizing its flexibility. An analogous arrangement is used for measuring forces in transducers which utilize strain gauges formed by resistors deposited on a rigid support: two application points are integral with a first pressure member and the application point placed in opposition is integral with a second pressure member. This is described, for example, in "Strain sensitivity of thick-film resistors" J. S. Shah, IEEE Trans., CHMT-3, no. 4, 1980, p. 554. However, the method of connecting the gauge and the pressure members determines the validity of the measurement:
- a too rigid connection leads to excessive strains (hyperstatic state) and the measurement may become incorrect,
- a too slack connection may lead to play between the pressure members, which may lead to relative displacements of the gauge and the pressure members, so that the application points are shifted. The reproducibility of the measurement is changed by this.

The application points may have the shape of a knife edge. The knife edges may be perfectly parallel, which renders necessary an exact machining of the various members.

Also known is the document DE-U 8 705 713 which deals with a weighing platform for vehicles provided with a device which generates a restoring force in the presence of transversal forces in order to obtain centring and automatic return of the platform. To safeguard this lateral (translatory) movement of the platform, it is necessary to use two rollers for each of the directions in which the said centring is required to take place. A compact device is obtained in that two rollers are placed one on top of the other, which gives them the shape of a diabolo. This device renders it possible to correct the action of lateral forces by means of translatory movements. This, in fact, relates to a sophisticated mechanical solution to a centring problem for the platform.

The problem to be solved by the invention is not a platform centring problem, but one of the use of mechanically imperfect members in weighing devices operating in a wide range.

In fact, for applications which are to cover a wide range for financial reasons, it is not possible to use members which are perfectly machined. The members which one is compelled to use are imperfect as to their planeness, their parallelism, and their structure.

The problem posed is how to determine a construction for a strain gauge element which is at the same time robust, reliable, easy to assemble, and inexpensive to manufacture.

The solution is found in that the compression forces applied by at least one of the pressure members are transmitted to a first surface of the strain gauge by a cross formed by two cylindrical rods, the contact between the strain gauge (or the said pressure member) and the cross being exerted on a generating line of one of the rods (or the other rod) of the cross, permitting the said pressure member to carry out a tilting movement about the said rod (or the other rod).

Thus an imperfect parallelism between the surface of the strain gauge and the surface of the pressure member in contact with the cross can advantageously be accommodated.

It is possible that the strain gauge is in contact with several pressure members by means of several crosses in this manner. Preferably, however, to realise a force transducer of low cost, the reactionary compression forces applied to a second surface of the strain gauge by the other pressure member are transmitted by two cylindrical rods which are substantially parallel to one another and placed at a certain distance from one another at either end of the strain gauge, one of the rods of the cross provided on the first surface being placed substantially at half the said distance and substantially parallel to the two other rods provided at the said second surface.

The two rods provided at the second surface are preferably formed by two tensioned wires. Their diameter may be chosen to be lower than the maximum sagitta which can be obtained without the strain gauge breaking. This gauge accordingly butts against the pressure member so that its displacement is limited.

It is possible to use one or several strain gauge elements of this type for realising force transducers used, for example, in a balance, or for forming detectors consisting, for example, of plates on which compression forces are exerted.

Figure 2:
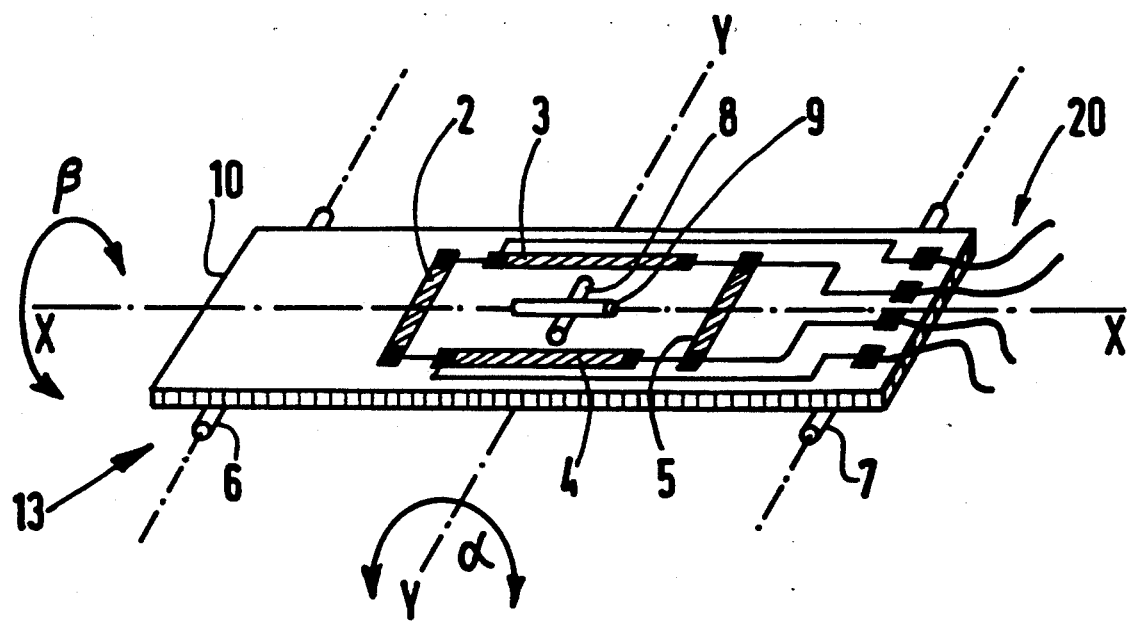
Figure 3:
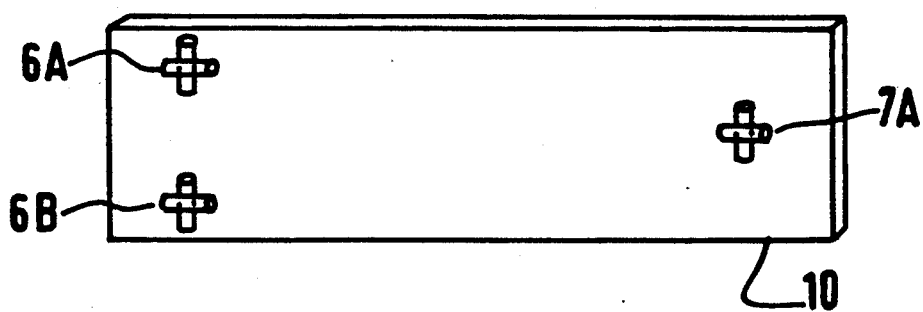

The invention will be better understood from the following Figures given by way of non-limitative examples, in which:

FIG. 1 shows a diagram of a strain gauge element according to the invention,

FIG. 2 gives a detailed view of a strain gauge provided with a cross and two rods for the application of the forces, FIG. 3 shows a diagram representing the crosses and their positions relative to the strain gauge.

FIG. 1 shows a strain gauge element 15 comprising two pressure members 11, 12 which press against a strain gauge 13 by way of a cross 14 and two rods 6, 7.

FIG. 2 shows a more detailed view of the strain gauge 13. It is formed by a support 10, for example made of alumina, on which an arrangement of resistors 2, 3, 4, 5 is deposited, for example in the form of a Wheatstone bridge, so that it is not sensitive to temperature fluctuations. These resistors may be deposited by means of, for example, silk-screen printing. The electrical connections are provided by wires 20.

The gauge 13 supports a cross formed by two cylindrical rods 8, 9 and rests on two rods 6, 7. The cross is preferred to a simple ball (which in the ideal case exerts a point force), because the latter would induce a considerable local stress which would involve the risk of breaking the gauge. To avoid this and to dispose nevertheless of an equivalent mobility, a cross formed by two cylindrical rods is used in such a manner that a generating line of one of the rods is substantially parallel to the rods 6, 7. It has been found in practice that the pressure members 11, 12, which are generally substantially plane, are not perfectly parallel to one another: an angular deviation α about the axis YY thus is of no importance any more, since the pressure member 11 pivots about the rod 8 then. Similarly, an angular deviation β about the axis XX also is of no importance since the pressure member 12 also pivots about the rod 9 then.

To ensure the positional stability of these rods, it is possible to mount the two rods 8 and 9 with a solder connection point at a mutual angle of 90° so as to achieve a total mobility.

Preferably, the two supporting generating lines of the two rods are not in one and the same plane. Nevertheless, this is possible by modifying the clearances either in the strain gauge or in the pressure member involved by adapting their dimensions.

For a correct functioning of the strain gauge element, one of the rods of the cross (rod 8 in FIG. 2) is placed substantially parallel to the rods 6 and 7 and substantially in the centre of the distance separating the latter. The cross 14 is held in position by means of a flexible product, for example, a flexible glue or by means of an enveloping agent, for example, an elastomer compound such as "SYLGARD"[1]. This can also ensure on the one hand a protection of the resistor layers of the gauge against any attack by corrosive liquids and on the other hand an electrical insulation.
[1]registered trade mark The cross may also be kept in position by the application of adapted recesses in the strain gauge and/or the pressure member.

The pressure member 11 itself may not have a perfect flatness. To compensate this, as has already been pointed out, it is possible to replace the rods 6, 7 by three point-shaped supports or by three crosses (6A, 6B and 7A) identical to cross 14 described above so as to define a supporting pseudo-triangle, as is shown in FIG. 3.

If, as will generally be the case, the pressure member 11 is comparatively plane, an intermediate solution may be adopted. To this end, the crosses 6A, 6B and 7A are replaced by single rod portions which are mutually parallel and situated in the same locations as the crosses 6A, 6B and 7A described above. Then the strain gauge resting on these rod portions bears on three generating lines according to a supporting pseudo-triangle. The prefix "pseudo" indicates that the tips of the triangle are not actually point-shaped.

By way of example, a strain gauge element according to the invention was used for realising a balance. It was formed by an alumina plate of 45×16×1 mm. The cross was formed from two rods of 1, 5 mm diameter and 6 mm length. The rods 6 and 7 consisted of two tensioned wires of 0, 1 mm diameter. Preferably, this diameter is smaller than the maximum sagitta which can occur without the strain gauge breaking.

Also by way of example, several strain gauge elements according to the invention were used for realising a pressure-sensitive control panel. For this purpose, the upper plate of the panel was supported by three such elements arranged in a triangle so that the coordinates of the point of application of a force applied at any point of the panel could be determined from the signals supplied by each strain gauge element.

We claim:

1. A strain gauge element comprising a strain gauge pressed between two pressure members which apply compression forces, characterized in that the compression forces applied by at least one of the pressure members are transmitted to a first surface of the strain gauge by a cross formed by two cylindrical rods, the contact between the strain gauge (or the said pressure member) and the cross being exerted on a generating line of one of the rods (or the other rod) of the cross, permitting the said pressure member to carry out a tilting movement about the said rod (or the other rod).

2. A strain gauge element as claimed in claim 1, characterized in that the reactionary compression forces applied to a second surface of the strain gauge by another pressure member are transmitted by at least one cross.

3. A strain gauge element as claimed in claim 2, characterized in that the said reactionary forces are transmitted by three crosses arranged in a supporting pseudo-triangle.

4. A strain gauge element as claimed in claim 1, characterized in that the reactionary compression forces applied to a second surface of the strain gauge by the other pressure member are transmitted by two cylindrical rods, which are substantially parallel to one another and placed at a certain distance from one another at either end of the strain gauge, one of the rods of the cross provided on the first surface being placed substantially at half the said distance and substantially parallel to the two other rods provided at the said second surface.

5. An element as claimed in claim 4, characterized in that the two rods provided at the second surface are formed by two tensioned wires.

6. An element as claimed in claim 4 or 5, characterized in that one of the rods provided at the second surface is reduced to two colinear outer rod portions, while the other rod is reduced to one central portion in such a manner that the three portions form a supporting pseudo-triangle.

7. An element as claimed in any one of the claims 4 to 6, characterized in that the diameter of the rods is smaller than the maximum sagitta which can occur without the strain gauge breaking.

8. An element as claimed in any one of the claims 1 to 7, characterized in that the rods of the cross are approximately 1, 5 mm in diameter and 6 mm in length.

9. The use of at least one strain gauge element as claimed in any one of the claims 1 to 8 in the realisation of either a force transducer, or a balance, or a force-sensitive control panel.

* * * * *